United States Patent
Ido et al.

(10) Patent No.: US 9,935,307 B2
(45) Date of Patent: Apr. 3, 2018

(54) POSITIVE ELECTRODE LEAD AND ALKALINE SECONDARY BATTERY

(71) Applicants: FDK CORPORATION, Minato-ku, Tokyo (JP); Littlefuse Japan G.K., Minato-ku, Tokyo (JP)

(72) Inventors: Erika Ido, Tokyo (JP); Koji Izumi, Tokyo (JP); Satoshi Wada, Tokyo (JP); Hideaki Kitazume, Tokyo (JP); Yohei Mizukami, Inashiki (JP); Masatoshi Sakamoto, Inashiki (JP); Toshikazu Yamaoka, Inashiki (JP)

(73) Assignees: FDK CORPORATION, Tokyo (JP); Littelfuse Japan G.K., Tokyo (JP)

( * ) Notice: Subject to any disclaimer, the term of this patent is extended or adjusted under 35 U.S.C. 154(b) by 254 days.

(21) Appl. No.: 14/647,820

(22) PCT Filed: Nov. 26, 2013

(86) PCT No.: PCT/JP2013/081758
§ 371 (c)(1),
(2) Date: May 27, 2015

(87) PCT Pub. No.: WO2014/084203
PCT Pub. Date: Jun. 5, 2014

(65) Prior Publication Data
US 2015/0303445 A1    Oct. 22, 2015

(30) Foreign Application Priority Data

Nov. 30, 2012  (JP) .................................. 2012-261984

(51) Int. Cl.
*H01M 2/34*  (2006.01)
*H01M 10/28*  (2006.01)
(Continued)

(52) U.S. Cl.
CPC ............. *H01M 2/348* (2013.01); *H01M 2/22* (2013.01); *H01M 10/28* (2013.01); *H01M 10/30* (2013.01);
(Continued)

(58) Field of Classification Search
CPC .... H01M 10/28; H01M 10/30; H01M 10/345; H01M 10/425; H01M 10/4257;
(Continued)

(56) References Cited

U.S. PATENT DOCUMENTS

2003/0026053 A1 * 2/2003 Toth ..................... H01C 1/1406
361/106
2006/0044728 A1 * 3/2006 Kim ........................ H01M 2/34
361/103
(Continued)

FOREIGN PATENT DOCUMENTS

JP   06-243856     9/1994
JP   2005-129442 A  5/2005
(Continued)

OTHER PUBLICATIONS

Search Report for PCT/JP2013/081758, dated Jan. 7, 2014.
Written Opinion for PCT/JP2013/081758, dated Jan. 7, 2014.

*Primary Examiner* — Miriam Stagg
*Assistant Examiner* — Claire L Roe
(74) *Attorney, Agent, or Firm* — Kinney & Lange, P.A.

(57) ABSTRACT

A positive electrode lead of the present invention comprises: a strip-shaped first lead half body electrically connected to a sealing body of a nickel-hydrogen secondary battery; a strip-shaped second lead half body electrically connected to a positive electrode of an electrode group of the nickel-hydrogen secondary battery; a PTC thermistor joined between the first lead half body and the second lead half body; and a protective member covering a portion of the
(Continued)

positive electrode lead where the PTC thermistor is joined. The second lead half body includes a portion to be bent on the outer side of the portion covered with the protective member. A recessed groove is formed in the portion covered with the protective member and has a shape elongated in a direction intersecting with a bend line of the portion to be bent.

10 Claims, 9 Drawing Sheets

(51) Int. Cl.
*H01M 2/22* (2006.01)
*H01M 10/30* (2006.01)
*H01M 10/34* (2006.01)
(52) U.S. Cl.
CPC .... *H01M 10/345* (2013.01); *H01M 2200/106* (2013.01)

(58) Field of Classification Search
CPC .......... H01M 2/22; H01M 2/34–2/348; H01M 2200/106
See application file for complete search history.

(56) References Cited

U.S. PATENT DOCUMENTS

2009/0159347 A1* 6/2009 Zhou ................... H01M 10/615
  180/65.1
2013/0202917 A1* 8/2013 Tanaka ................... H01C 7/021
  429/7

FOREIGN PATENT DOCUMENTS

JP 2012-054099 A 3/2012
WO WO-2006/022168 A1 3/2006

* cited by examiner

POSITIVE ELECTRODE LEAD AND ALKALINE SECONDARY BATTERY

TECHNICAL FIELD

The present invention relates to a positive electrode lead of an alkaline secondary battery.

BACKGROUND ART

A commonly-known alkaline secondary battery, such as a nickel-hydrogen secondary battery, if short-circuited due to, for example, external short-circuiting, may become heated to a high temperature for reasons of the low internal resistance and the amount of high internal energy of the battery. Accordingly, a commonly-known alkaline secondary battery includes a PTC (positive temperature coefficient) thermistor built in a positive electrode lead for electrically connecting the positive electrodes and the positive electrode terminal of an electrode group inside the battery for the purpose of ensuring safety in case of external short-circuiting (see, for example, Patent Document 1). This PTC thermistor is an electronic component composed of electrically-conductive particles. The PTC thermistor is low in electrical resistance value under normal conditions, and therefore, exhibits superior electrical conductivity. In addition, the PTC thermistor has characteristics in which the electrical resistance value of the thermistor increases drastically when the temperature thereof rises to a predetermined value.

In the alkaline secondary battery configured as described above, an excess current flows in the PTC thermistor built in the positive electrode lead if external short-circuiting occurs in the alkaline secondary battery for some reason, and therefore, the temperature of the battery rises. When the temperature of the PTC thermistor reaches a predetermined value, the electrical resistance value of the PTC thermistor increases, thereby suppressing a current flowing from the electrode group to the positive electrode terminal at the PTC thermistor-mounted portion of the positive electrode lead. The excess current flowing within the alkaline secondary battery is thus suppressed, thereby preventing the alkaline secondary battery from becoming heated if external short-circuiting occurs.

The positive electrode lead including the PTC thermistor built therein is configured by, for example, disposing two metallic strip-shaped bodies in series, partially overlapping the leading ends of the strip-shaped bodies with each other, and solder-joining the PTC thermistor between the separate and opposed leading ends of the strip-shaped bodies. The portion where the PTC thermistor is solder-joined is covered and protected with, for example, a protective member composed of alkali-resistant epoxy resin or the like. This is for the purpose of preventing the deterioration or the like of the PTC thermistor due to high-pressure oxygen generated inside the alkaline secondary battery and the deterioration or the like of soldered portions due to an alkaline ambient atmosphere inside the alkaline secondary battery.

PRIOR ART DOCUMENT

Patent Document

Patent Document 1: Japanese Patent Laid-Open No. 06-243856

SUMMARY OF THE INVENTION

Problems to be Solved by the Invention

In the above-described positive electrode lead of the alkaline secondary battery, the metallic strip-shaped bodies need to be disposed in a limited narrow space between the positive electrode terminal and the electrode group inside the alkaline secondary battery, while bending parts of the metallic strip-shaped bodies, in a process for manufacturing the alkaline secondary battery. If at that time, the metallic strip-shaped bodies are bent at a portion where the protective member covering the solder-joined portion of the PTC thermistor is disposed, the protective member becomes broken. The solder-joined portion of the PTC thermistor therefore becomes exposed. This exposure may impair functions for protecting the PTC thermistor with the protective member. Even if the metallic strip-shaped bodies are bent on the outer side the portion where the protective member is disposed, the protective member may also become broken in some cases due to bending stress thus applied.

An object of the present invention, which has been accomplished in view of such circumstances as described above, is to provide a positive electrode lead of an alkaline secondary battery in which functions for protecting a PTC thermistor with a protective member are less likely to be impaired.

Means for Solving the Problems

First Aspect of the Present Invention

A first aspect of the present invention is a positive electrode lead of an alkaline secondary battery comprising an exterior can the upper end of which is open; an electrode group formed by stacking positive electrodes and negative electrodes with separators interposed thereamong and housed in the exterior can along with an alkaline electrolytic solution; and a sealing body fixed to the open end of the exterior can while being insulated and including a cap plate for sealing the opening and a positive electrode terminal electrically connected to the cap plate, the positive electrode lead being disposed between the electrode group and the sealing body to electrically connect the positive electrodes of the electrode group and the sealing body and comprising a strip-shaped first lead half body electrically connected to the sealing body; a strip-shaped second lead half body electrically connected to the positive electrode; a PTC thermistor joined between the first lead half body and the second lead half body; and a protective member covering a portion of the positive electrode lead where the PTC thermistor is joined, wherein the second lead half body is provided with a portion to be bent when the second lead half body is disposed between the electrode group and the sealing body on the outer side of the portion covered with the protective member, a recessed groove is formed in the portion covered with the protective member, and the recessed groove has a shape elongated in a direction intersecting with a bend line of the portion to be bent.

Recessed grooves are formed in the portion of the second lead half body where the protective member is disposed. Each recessed groove has a shape elongated in a direction intersecting with a bend line of the portion to be bent, and therefore, the portion is improved in rigidity more than other portions. Accordingly, it is possible to reduce the possibility of the protective member becoming broken due to bending stress acting on the second lead half body in a process for manufacturing the alkaline secondary battery.

In addition, as the result of the portion of the second lead half body where the protective member is disposed being improved in rigidity against bending more than other portions, it is possible to reduce the possibility of the second lead half body becoming bent at the portion where the protective member is disposed. Accordingly, the second lead half body securely bends at the portion where the second lead half body should bend in a process for manufacturing the alkaline secondary battery. It is therefore possible to reduce the possibility of the protective member becoming broken in a process for manufacturing the alkaline secondary battery.

Consequently, according to the first aspect of the present invention, it is possible to obtain the working effect of being able to provide a positive electrode lead of an alkaline secondary battery in which functions for protecting the PTC thermistor with the protective member are less likely to be impaired.

Second Aspect of the Present Invention

A second aspect of the present invention is a positive electrode lead, wherein in the above-described first aspect of the present invention, a plurality of the recessed grooves are provided in a line in the portion of the second lead half body covered with the protective member in a direction along the bend line.

According to such a characteristic feature as described above, the portion of the second lead half body where the protective member is disposed can be improved in rigidity against bending even more than other portions. It is therefore possible to further reduce the possibility of the protective member becoming broken in a process for manufacturing an alkaline secondary battery. Consequently, according to the second aspect of present invention, it is possible to further reduce the possibility of functions for protecting the PTC thermistor with the protective member being impaired.

Third Aspect of the Present Invention

A third aspect of the present invention is a positive electrode lead, wherein in the above-described first or second aspect of the present invention, a fold is previously formed in the portion of the second lead half body to be bent.

According to such a characteristic feature as described above, the portion of the second lead half body to be bent bends more easily than other portions. Thus, the second lead half body bends more securely at the portion to be bent. Accordingly, it is possible to further reduce the possibility of the protective member becoming broken in a process for manufacturing an alkaline secondary battery. Consequently, according to the third aspect of the present invention, it is possible to further reduce the possibility of functions for protecting the PTC thermistor with the protective member being impaired.

Fourth Aspect of the Present Invention

A fourth aspect of the present invention is a positive electrode lead, wherein in the above-described third aspect of the present invention, the second lead half body includes a step, in the portion thereof to be bent, formed of two folds formed by bending the second lead half body in the opposite bending direction.

If, for example, the second lead half body is given a fold by bending the lead half body at the portion where the lead half body is to be bent and is left bent as is, the positive electrode lead of the lead half body has a shape different from a shape that the lead half body has had conventionally. Accordingly, there may arise the need for process changes, equipment modifications and the like in a process for manufacturing an alkaline secondary battery.

On the other hand, if, for example, the second lead half body is bent at the portion thereof where the second lead half body should bend to form a fold in the portion and then the second lead half body is straightened back, it is possible to form the positive electrode lead into the same shape that the positive electrode lead has had conventionally. Since the portion where the fold is formed is once again bent, however, in a process for manufacturing an alkaline secondary battery, cracks or breakages may be produced at that time in the portion where the second lead half body is bent.

According to the fourth aspect of the present invention, a step formed of two folds formed by bending the second lead half body in the opposing bending direction is provided in the portion of the second lead half body to be bent. By adopting such a configuration, the second lead half body is maintained in the original straight state thereof, i.e., in substantially the same shape that the second lead half body has had conventionally. Accordingly, there arises no need for process changes, equipment modifications and the like in a process for manufacturing an alkaline secondary battery. In addition, the portion in which folds are formed by bending need not be brought back to the original straight state thereof when the second lead half body is straightened back to the original state thereof. Consequently, when the second lead half body is bent at the portion in which the folds are formed in a process for manufacturing an alkaline secondary battery, it is possible to reduce the possibility of cracks or breakages being produced in the bent portion.

Fifth Aspect of the Present Invention

A fifth aspect of the present invention is a positive electrode lead, wherein in the above-described fourth aspect of the present invention, notches are additionally formed in the portion of the second lead half body to be bent.

According to such a characteristic feature as described above, the notches enable the portion of the second lead half body to be bent to become more easily bendable.

Sixth Aspect of the Present Invention

A sixth aspect of the present invention is a positive electrode lead, wherein in the above-described fifth aspect of the present invention, the notches of the second lead half body are formed on both side edges of the portion to be bent.

According to such a characteristic feature as described above, the portion of the second lead half body to be bent on both side edges of which the notches are formed is easiest to bend. That is, the second lead half body is most easily bendable with a straight line connecting the notches on both side edges serving as a bend line. Consequently, the portion of the second lead half body to be bent can be more precisely bent along a desired bend line in a process for manufacturing an alkaline secondary battery.

Seventh Aspect of the Present Invention

A seventh aspect of the present invention is a positive electrode lead, wherein in any one of the above-described first to sixth aspects of the present invention, notches are formed on both edges of the portion to be bent when the first lead half body is disposed between the electrode group and the sealing body.

According to such a characteristic feature as described above, the portion of the first lead half body to be bent on both side edges of which the notches are formed is easiest to bend. That is, the first lead half body is most easily bendable with a straight line connecting the notches on the both side edges serving as a bend line. Consequently, the portion of the first lead half body to be bent can be more precisely bent along a desired bend line in a process for manufacturing an alkaline secondary battery. It is therefore possible to reduce the possibility of the protective member becoming broken.

Eighth Aspect of the Present Invention

An eighth aspect of the present invention is a positive electrode lead, wherein in the above-described seventh aspect of the present invention, the first lead half body is provided with portions to be bent in a plurality of places, and notches are formed on both edges of each of the plurality of portions to be bent.

According to such a characteristic feature as described above, even if a location where the first lead half body is connected to the sealing body is displaced due to dimensional errors or the like of the first lead half body, the bending position and shape of the first lead half body can be flexibly adjusted accordingly in a process for manufacturing an alkaline secondary battery. Consequently, it is possible to further reduce the possibility of the protective member becoming broken in the process for manufacturing an alkaline secondary battery.

Ninth Aspect of the Present Invention

A ninth aspect of the present invention is a positive electrode lead, wherein in the above-described seventh aspect of the present invention, the first lead half body is provided with portions to be bent in a plurality of places, and notches are formed on both edges of a region encompassing the plurality of portions to be bent.

According to such a characteristic feature as described above, even if a location where the first lead half body is connected to the sealing body is displaced due to dimensional errors or the like of the first lead half body, the bending position and shape of the first lead half body can be flexibly adjusted accordingly in a process for manufacturing an alkaline secondary battery. Consequently, it is possible to further reduce the possibility of the protective member becoming broken in the process for manufacturing an alkaline secondary battery.

Tenth Aspect of the Present Invention

A tenth aspect of the present invention is a positive electrode lead, wherein in any one of the above-described first to ninth aspects of the present invention, the portion of the first lead half body or the second lead half body covered with the protective member is formed so as to be larger in plate thickness than portions outside the portion.

According to such a characteristic feature as described above, the first lead half body or the second lead half body is more easily bendable on the outer side of the portion covered with the protective member. Consequently, it is possible to further reduce the possibility of the protective member becoming broken in a process for manufacturing an alkaline secondary battery.

Eleventh Aspect of the Present Invention

An eleventh aspect of the present invention is an alkaline secondary battery comprising an exterior can the upper end of which is open; an electrode group formed by stacking positive electrodes and negative electrodes with separators interposed thereamong and housed in the exterior can along with an alkaline electrolytic solution; a sealing body fixed to the open end of the exterior can while being insulated and including a cap plate for sealing the opening and a positive electrode terminal electrically connected to the cap plate; and a positive electrode lead according to any one of the above-described first to tenth aspects of the present invention According to the eleventh aspect of the present invention, it is possible to obtain the working effect of any one of the above-described first to tenth aspects of the present invention in the alkaline secondary battery.

Advantageous Effects of the Invention

According to the present invention, it is possible to provide a positive electrode lead of alkaline secondary battery in which functions for protecting the PTC thermistor with the protective member are less likely to be impaired.

MODE FOR CARRYING OUT THE INVENTION

Hereinafter, embodiments of the present invention will be described while referring to the accompanying drawings. It should be noted that needless to say, the present invention is not limited to the embodiments to be described hereinafter, but may be modified in various other ways within the scope of the present invention as defined by the claims appended hereto.

<Configuration of Nickel-Hydrogen Secondary Battery 1>

The configuration of the nickel-hydrogen secondary battery 1 serving as an "alkaline secondary battery" will be described while referring to FIGS. 1 and 2.

Figure 1:
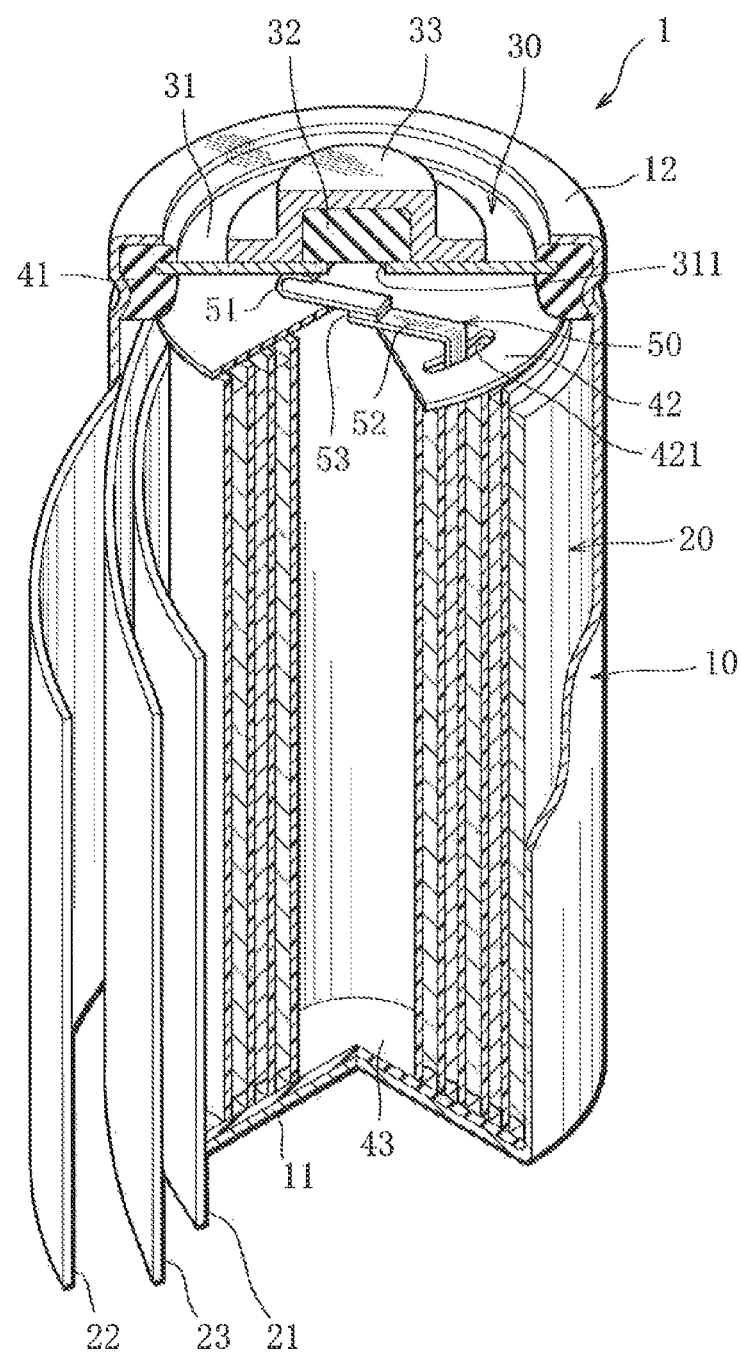
FIG. 1 is a perspective view taken by partially cutting away a nickel-hydrogen secondary battery.
Figure 2:
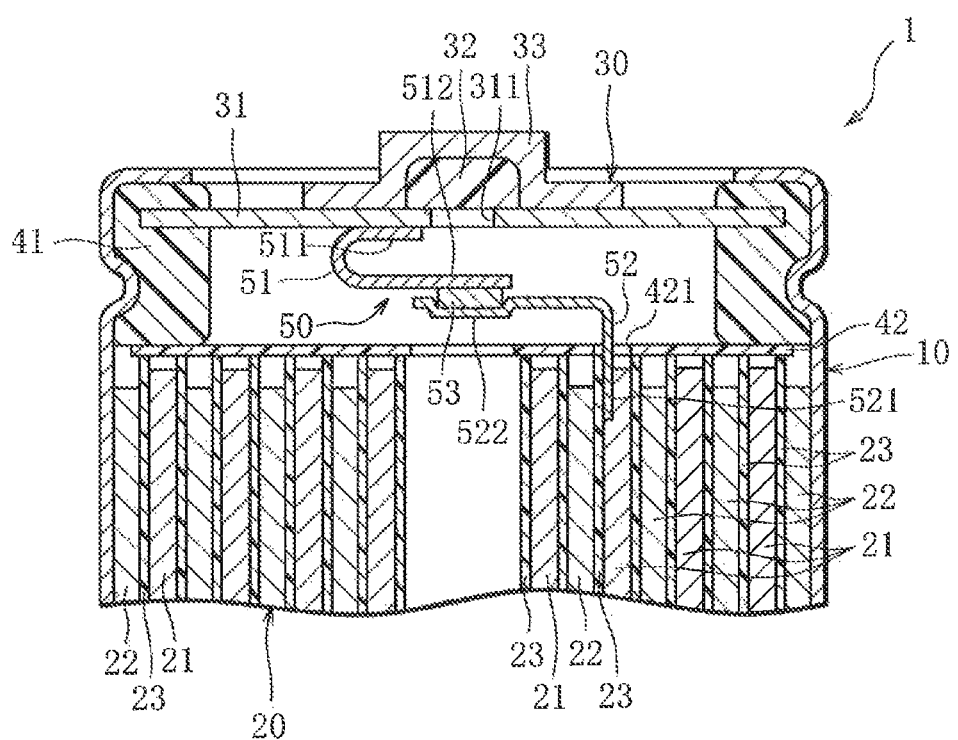
FIG. 2 is a cross-sectional view illustrating an upper cross-section of the nickel-hydrogen secondary battery.

FIG. 1 is a perspective view taken by partially cutting away the nickel-hydrogen secondary battery 1. FIG. 2 is a cross-sectional view illustrating an upper cross-section of the nickel-hydrogen secondary battery 1.

The nickel-hydrogen secondary battery 1 is provided with an exterior can 10, an electrode group 20, a sealing body 30, and a positive electrode lead 50.

The exterior can 10 is formed from a material having electrical conductivity and has a bottomed cylindrical shape the upper end of which is open, and a bottom wall 11 of the exterior can 10 functions as a negative electrode terminal.

The electrode group 20 is housed in the exterior can 10 along with an alkaline electrolytic solution and includes positive electrodes 21, negative electrodes 22 and separators 23 all of which have a belt-like shape. The electrode group 20 is constructed by spirally winding the positive electrodes 21 and the negative electrodes 22 with the positive and negative electrodes alternately stacked with the separators interposed thereamong. The outermost periphery of the electrode group 20 is formed of part (outermost peripheral portion) of a negative electrode 22 and has contact with the inner peripheral wall of the exterior can 10. Accordingly, the exterior can 10 is electrically connected to the negative electrodes 22 of the electrode group 20. A circular insulating member 42 is disposed between the electrode group 20 and the cover plate 31, in order to prevent internal short-circuiting. A circular insulating member 43 is likewise disposed between the electrode group 20 and a bottom wall 11 of the exterior can 10, in order to prevent internal short-circuiting.

The sealing body 30 is a structure fixed to an open end of the exterior can 10, while being insulated, to seal up the exterior can 10. The sealing body 30 includes the cover plate 31, a valve element 32 and a positive electrode terminal 33. The cover plate 31 is a circular plate-shaped member having electrical conductivity. A central through-hole 311 is formed in the center of the cover plate 31, and the valve element 32 for closing the central through-hole 311 is disposed on an outer surface of the cover plate 31. The valve element 32 is a member formed from an elastic material, such as rubber. The positive electrode terminal 33 is a flanged cylindrical-shaped member. The positive electrode terminal 33 is formed from a material having electrical conductivity and is provided with an unillustrated gas vent hole. The positive electrode terminal 33 is fixed to the upper surface of the cover plate 31, so as to cover the valve element 32, and is electrically connected to the cover plate 31, while pressing the valve element 32 against the cover plate 31.

The cover plate 31 and a ring-shaped insulating gasket 41 surrounding this cover plate 31 are disposed inside the opening of the exterior can 10. The insulating gasket 41 is fixed to the open end 12 of the exterior can 10 by swaging the open end 12. That is, the cover plate 31 and the insulating gasket 41 airtightly plug up the opening of the exterior can 10 in conjunction with each other. Under normal conditions, the central through-hole 311 of the cover plate 31 is airtightly closed by the valve element 32. If a gas is generated inside the exterior can 10 and the internal pressure thereof rises, the valve element 32 is compressed by the internal pressure to open the central through-hole 311. Consequently, the gas generated inside the exterior can 10 is released to the outside from the exterior can 10 through the central through-hole 311 and the gas vent hole of the positive electrode terminal 33. That is, the central through-hole 311 of the cover plate 31, the valve element 32 and the positive electrode terminal 33 constitute a safety valve that operates if a gas is generated inside the exterior can 10 and the internal pressure thereof rises.

The positive electrode lead 50 is a structure disposed between the electrode group 20 and the sealing body 30 to electrically connect the positive electrodes 21 of the electrode group 20 and the positive electrode terminal 33 of the sealing body 30. The positive electrode lead 50 includes a first lead half body 51, a second lead half body 52, and a PTC thermistor 53. The first lead half body 51 and the second lead half body 52 are strip-shaped members composed of a material having electrical conductivity. The first lead half body 51 includes a cover plate connection end 511 electrically connected to the cover plate 31 of the sealing body 30, and a widened rectangular thermistor connection end 512 to which the PTC thermistor 53 is solder-joined. The second lead half body 52 includes a positive electrode connection end 521 electrically connected to the positive electrodes 21 of the electrode group 20 through a slit 421 provided in the insulating member 42, and a widened rectangular thermistor connection end 522 to which the PTC thermistor 53 is solder-joined. The PTC thermistor 53 is solder-joined between the thermistor connection end 512 of the first lead half body 51 and the thermistor connection end 522 of the second lead half body 52.

The PTC thermistor 53 is composed of, for example, an insulating polymer in which electrically-conductive particles are dispersed. Since the electrically-conductive particles of such a PTC thermistor 53 have contact with one another under normal conditions, the PTC thermistor 53 has a low electrical resistance value and exhibits superior electrical conductivity. On the other hand, if external short-circuiting occurs in the nickel-hydrogen secondary battery 1, a large current flows in the PTC thermistor 53 and the thermistor becomes heated. Accordingly, the insulating polymer as a whole expands due to this heat. Consequently, electrically-conductive particles having contact with one another decrease in number, and therefore, the electrical resistance value increases drastically. By taking advantage of such characteristics of the PTC thermistor 53, it is possible to prevent overcurrents generated when external short-circuiting occurs. The PTC thermistor 53, when freed from heat generation and cooled down, reverts to the original state of being low in electrical resistance value since the insulating polymer contracts.

In consideration of the condition that the surface temperature of the nickel-hydrogen secondary battery 1 does not exceed 70° C. (when toy components are evaluated at 25° C.) which is the maximum temperature of accessible toy components defined in, for example, the Japanese domestic toy standards and that the PTC thermistor 53 is prevented from malfunction, the operating temperature of the PTC thermistor 53 is preferably set to the range from 80° C. to 100° C. The reason for this is that since a temperature difference arises between the interior and the external surface of the nickel-hydrogen secondary battery 1, the external surface temperature of the battery can be suppressed to 70° C. or lower even if the operating temperature of the PTC thermistor 53 is set to the range from 80° C. to 100° C. More specifically, the surface temperature of the nickel-hydrogen secondary battery 1 is approximately 50° C. to 55° C. even if the PTC thermistor 53 of the nickel-hydrogen secondary battery 1 become heated and the temperature of the thermistor rises to 80° C. to 100° C.

First Embodiment of Positive Electrode Lead 50

A first embodiment of the positive electrode lead 50 according to the present invention will be described while referring to FIGS. 3 to 5.

Figure 3:
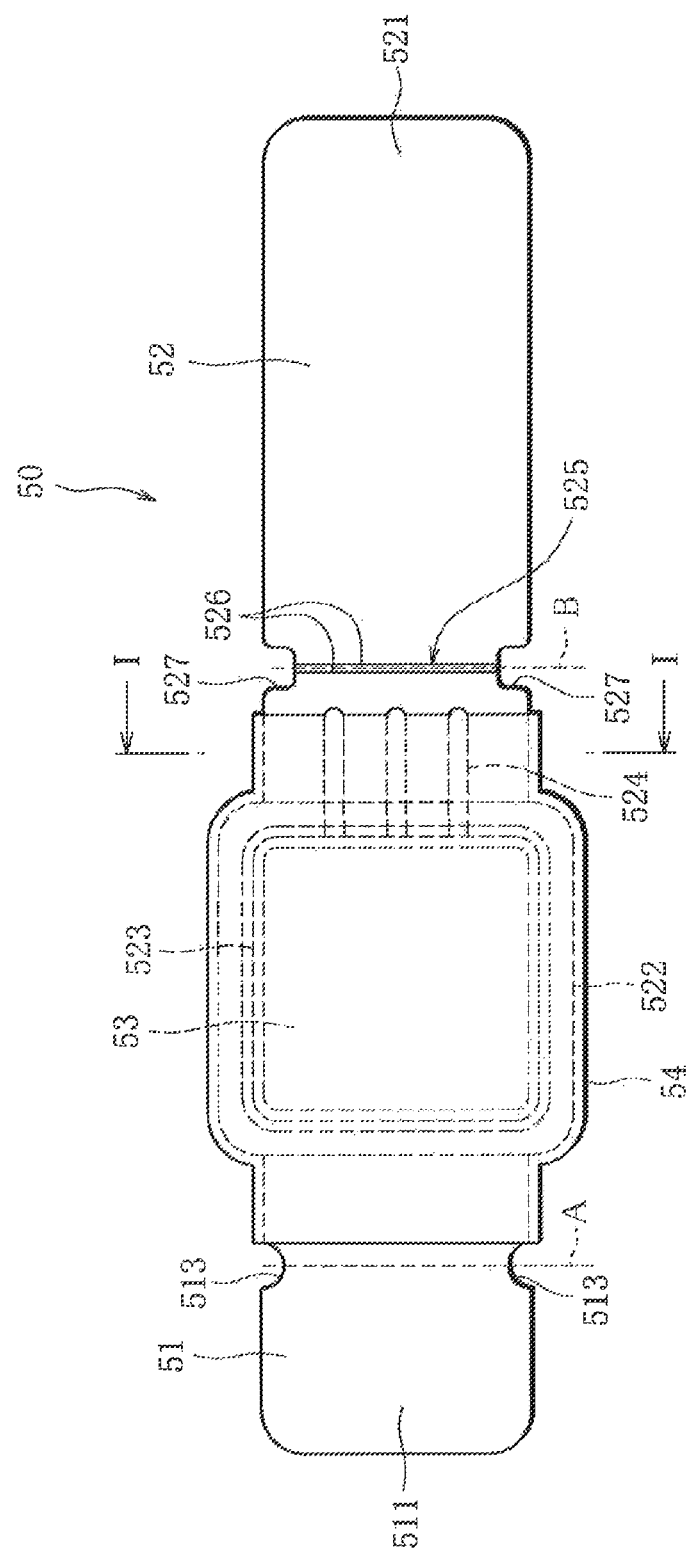
FIG. 3 is a plan view of a positive electrode lead of a first embodiment.
Figure 4:
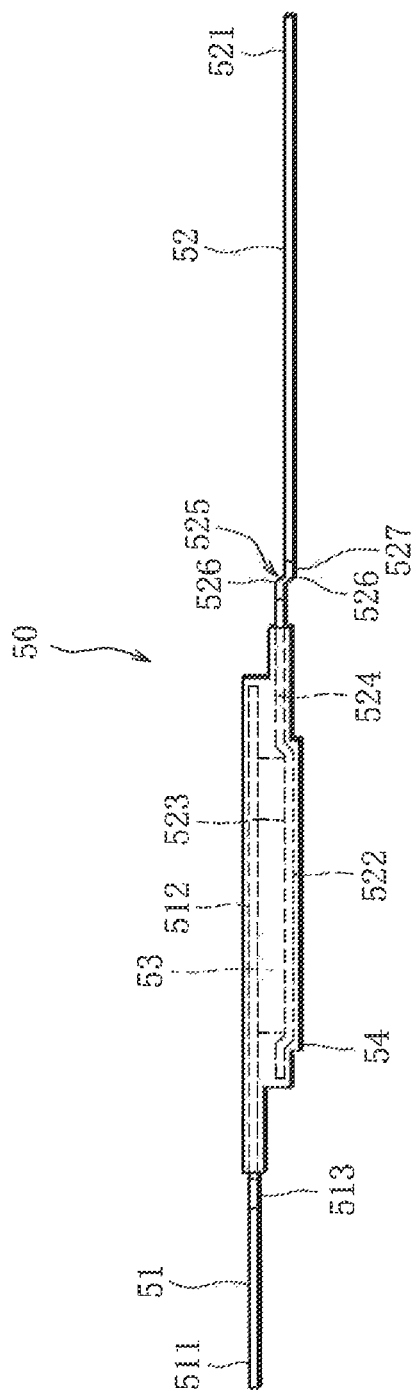
FIG. 4 is a side view of the positive electrode lead of the first embodiment.
Figure 5:
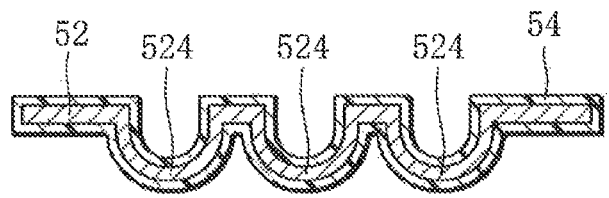
FIG. 5 is a cross-sectional view of the positive electrode lead of the first embodiment illustrating the I-I cross-section of FIG. 3.

FIGS. 3 to 5 illustrate the positive electrode lead 50 as a component before being built into the nickel-hydrogen secondary battery 1. FIG. 3 is a plan view of the positive electrode lead 50 of the first embodiment. FIG. 4 is a side view of the positive electrode lead 50 of the first embodiment. FIG. 5 is a cross-sectional view illustrating the I-I cross-section of FIG. 3.

The positive electrode lead 50 comprises a protective member 54 (not illustrated in FIGS. 1 and 2) for covering the portions of the first lead half body 51 and the second lead half body 52 where the PTC thermistor 53 is solder-joined. The protective member 54 is incorporated in order to prevent the deterioration or the like of the PTC thermistor 53 due to high-pressure oxygen generated inside the nickel-hydrogen secondary battery 1 and the deterioration or the like of soldered portions due to an alkaline ambient atmosphere inside the nickel-hydrogen secondary battery 1. The protective member 54 is composed of, for example, alkali-resistant epoxy resin.

In the first lead half body 51, a portion to be bent (bend line A) when the positive electrode lead 50 is placed between the electrode group 20 and the sealing body 30 is disposed on the outer side of the portion covered with the protective member 54. A notch 513 is formed on each of both side edges of the portion to be bent. By forming the notches 513 in the portion of the first lead half body 51 to be bent in this way, it is possible to make the portion of the first lead half body 51 to be bent easily bendable.

The second lead half body 52 includes a concave portion 523 formed in the thermistor connection end 522. The PTC thermistor 53 is placed in the concave portion 523. The concave portion 523 enables the area of the PTC thermistor 53 exposed between the thermistor connection end 512 of the first lead half body 51 and the thermistor connection end 522 of the second lead half body 52 to be decreased as much as possible.

In the second lead half body 52, a portion to be bent (bend line B) when the positive electrode lead 50 is placed between the electrode group 20 and the sealing body 30 is disposed on the outer side of the portion covered with the protective member 54. In addition, three recessed grooves 524 are formed in the portion of the second lead half body 52 covered with the protective member 54. The three recessed grooves 524 have a shape elongated in a direction intersecting with the bend line B of the portion to be bent. These three recessed grooves 524 are formed by means of a drawing process and provided in a line in a direction along the bend line B.

The portion of the second lead half body 52 where the protective member 54 is disposed is improved in rigidity against bending more than other portions, as the result of the recessed grooves 524 being formed in the portion. Accordingly, it is possible to reduce the possibility of the protective member 54 becoming broken due to bending stress acting on the second lead half body 52 in a process for manufacturing the nickel-hydrogen secondary battery 1. It is therefore possible to reduce the possibility of functions for protecting the PTC thermistor 53 with the protective member 54 being impaired.

In addition, since the portion of the second lead half body 52 where the protective member 54 is disposed is improved in rigidity against bending more than other portions, it is possible to reduce the possibility of the second lead half body 52 becoming bent at the portion where the protective member 54 is disposed. Accordingly, the second lead half body 52 securely bends at the portion (bend line B) where the second lead half body 52 should bend in a process for manufacturing the nickel-hydrogen secondary battery 1. Thus, it is possible to reduce the possibility of the second lead half body 52 becoming bent at the portion where the protective member 54 is disposed and the protective member 54 becoming broken in the process for manufacturing the nickel-hydrogen secondary battery 1. It is therefore possible to reduce the possibility of functions for protecting the PTC thermistor 53 with the protective member 54 being impaired.

Note that the number of recessed grooves 524 is not limited in particular to 3. Needless to say, even only one recessed groove 524, for example, has effect. Increasing the number of recessed grooves 524 enables the portion of the second lead half body 52 where the protective member 54 is disposed to be further improved in rigidity against bending more than other portions and is, therefore, preferable.

Yet additionally, two folds 526 are previously formed in the portion (bend line B) of the second lead half body 52 to be bent. These folds are not essential constituent elements of the present invention, but make the portion of the second lead half body 52 to be bent more easily bendable than other portions. Accordingly, the second lead half body 52 more securely bends at the portion where the second lead half body 52 should bend. Thus, it is possible to further reduce the possibility of the protective member 54 becoming broken in a process for manufacturing the nickel-hydrogen secondary battery 1. It is therefore possible to further reduce the possibility of functions for protecting the PTC thermistor 53 with the protective member 54 being impaired.

Still additionally, the two folds 526 are formed by bending the second lead half body 52 in the opposing bending direction, and a step 525 is formed of the folds 526. This step 525 is not an essential constituent element of the present invention. By adopting such a configuration, however, the second lead half body 52 is maintained in the original straight state thereof, i.e., in substantially the same shape that the second lead half body 52 has had conventionally. Accordingly, there arises no need for process changes, equipment modifications and the like in the process for manufacturing the nickel-hydrogen secondary battery 1. In addition, the portion in which folds 526 are formed by bending need not be brought back to the original straight state thereof when the second lead half body 52 is straightened back to the original state thereof. Consequently, when the second lead half body 52 is bent at the step 525 in the process for manufacturing the nickel-hydrogen secondary battery 1, it is possible to reduce the possibility of cracks or breakages being produced in the bent portion.

Still additionally, a notch 527 is further formed on each of both side edges of the portion of the second lead half body 52 to be bent. These notches 527 are not essential constituent elements of the present invention, but make the portion of the second lead half body 52 on both side edges of which the notches 527 are formed most easily bendable. That is, the second lead half body 52 is most easily bendable with a straight line connecting the notches 527 on the both side edges serving as a bend line B. Consequently, the portion of the second lead half body 52 to be bent can be more precisely bent along a desired bend line B in the process for manufacturing the nickel-hydrogen secondary battery 1.

As described above, according to the present invention, it is possible to provide the positive electrode lead 50 of an alkaline secondary battery in which functions for protecting the PTC thermistor 53 with the protective member 54 are less likely impaired.

Note that the above-described recessed grooves 524, step 525, folds 526, and notches 527 of the second lead half body 52, for example, may be provided in the first lead half body 51 instead, or in both the first lead half body 51 and the second lead half body 52.

Second Embodiment of Positive Electrode Lead 50

A second embodiment of the positive electrode lead 50 according to the present invention will be described while referring to FIGS. 6 and 7.

Figure 6:
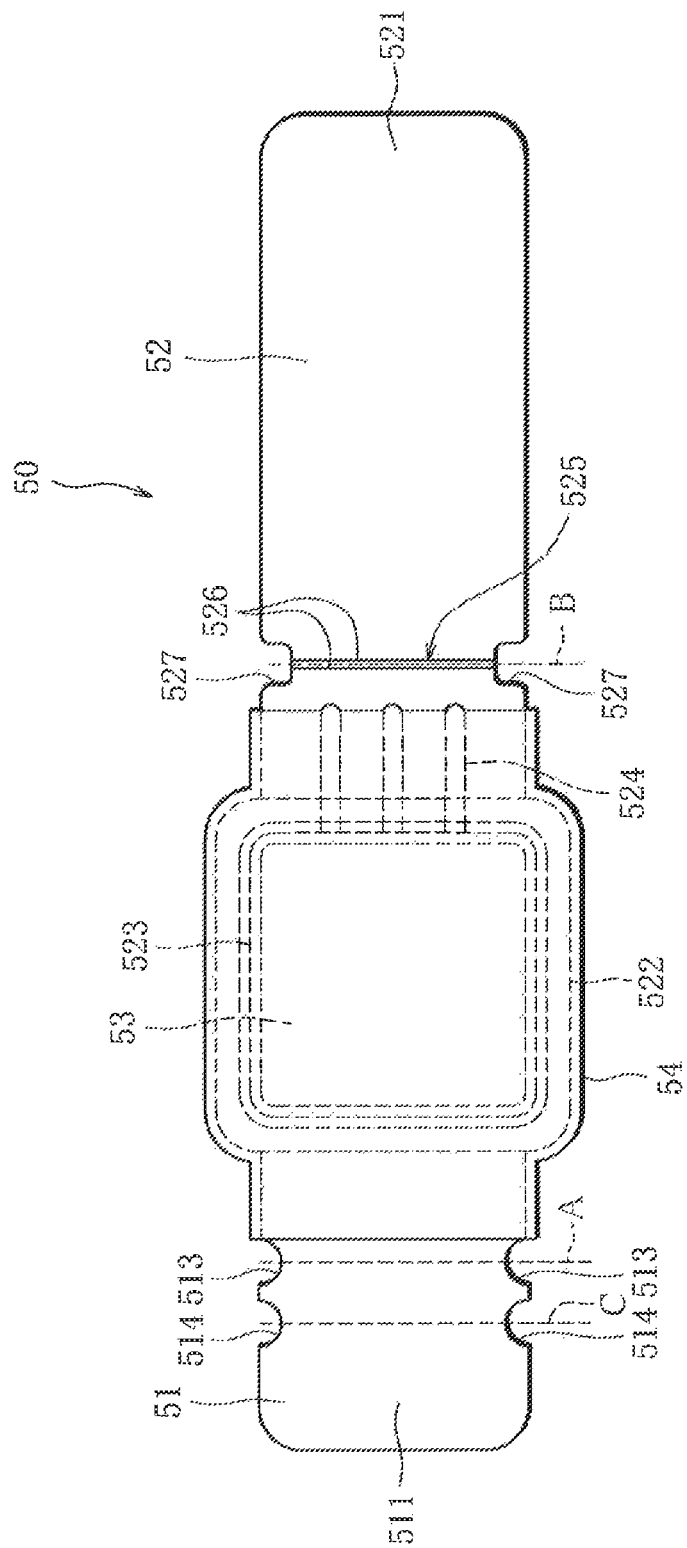
FIG. 6 is a plan view of a positive electrode lead of a second embodiment.
Figure 7:
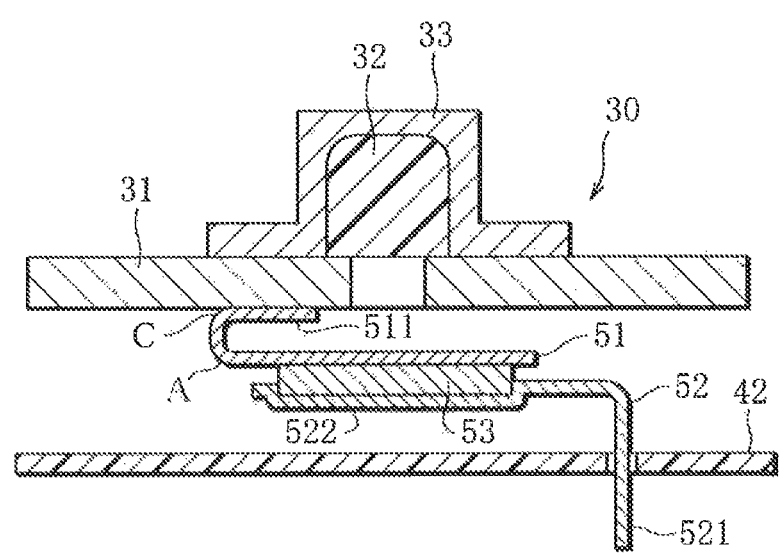
FIG. 7 is a principal-part side-sectional view of a nickel-hydrogen secondary battery into which a positive electrode lead of the second embodiment is built.

FIG. 6 illustrates the positive electrode lead 50 as a component before being built into the nickel-hydrogen secondary battery 1 and is a plan view of the positive electrode lead 50 of the second embodiment. FIG. 7 illustrates the positive electrode lead 50 of the second embodiment after having been built into the nickel-hydrogen secondary battery 1 and is a cross-sectional side view of a principal part of the nickel-hydrogen secondary battery 1.

In the positive electrode lead 50 of the second embodiment, portions to be bent (bend lines A and C) when the positive electrode lead 50 is placed between the electrode group 20 and the sealing body 30 are disposed in a plurality of places on the outer side of the portion of the first lead half body 51 covered with the protective member 54. In addition, in the positive electrode lead 50 of the second embodiment, notches 513 and 514 are formed on both edges of each of the plurality of portions to be bent. More specifically, in the positive electrode lead 50 of the second embodiment, a notch 513 is formed on each of both side edges of the portion to be bent shown by the bend line A, and a notch 514 is likewise formed on each of both side edges of the portion to be bent shown by the bend line C.

Note that since the rest of the above-described configuration is the same as the configuration of the first embodiment, common constituent elements are denoted by like reference numerals and characters and will be described in no further detail here.

According to the second embodiment of the positive electrode lead 50 configured in such a way as described above, even if a location where the first lead half body 51 is connected to the sealing body 30 is displaced due to dimensional errors or the like of the first lead half body 51, the bending position and shape of the first lead half body 51 can be flexibly adjusted accordingly in a process for manufacturing the nickel-hydrogen secondary battery 1. Consequently, it is possible to further reduce the possibility of the protective member 54 becoming broken in the process for manufacturing the nickel-hydrogen secondary battery 1.

Third Embodiment of Positive Electrode Lead 50

A third embodiment of the positive electrode lead 50 according to the present invention will be described while referring to FIG. 8.

Figure 8:
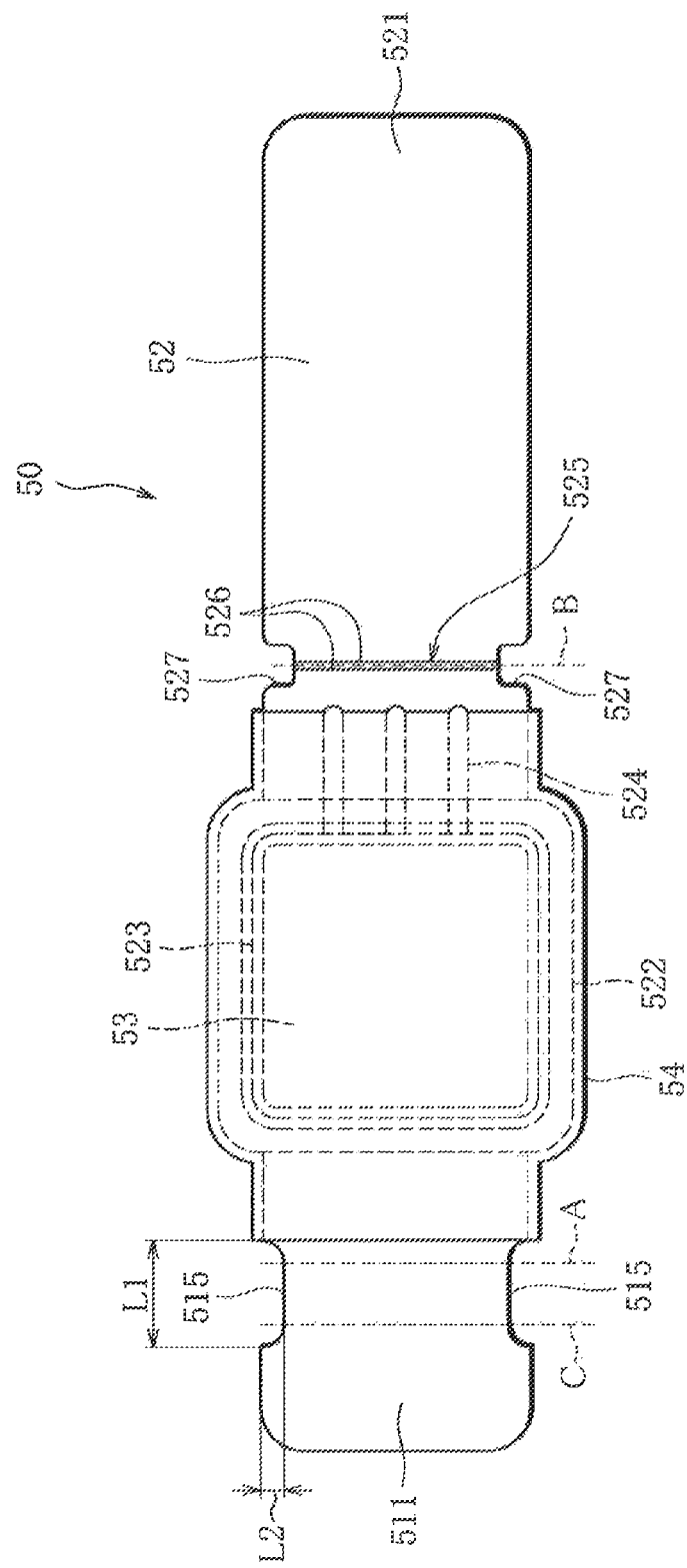
FIG. 8 is a plan view of a positive electrode lead of a third embodiment.

FIG. 8 illustrates the positive electrode lead 50 as a component before being built into the nickel-hydrogen secondary battery 1 and is a plan view of the positive electrode lead 50 of the third embodiment.

In the positive electrode lead 50 of the third embodiment, portions to be bent (bend lines A and C) when the positive electrode lead 50 is placed between the electrode group 20 and the sealing body 30 are disposed in a plurality of places on the outer side of the portion of the first lead half body 51 covered with the protective member 54. In addition, in the positive electrode lead 50 of the third embodiment, notches 515 are formed on both edges of a region encompassing the plurality of portions to be bent. More specifically, each notch 513 has a shape having a width of length L1 encompassing the plurality of portions to be bent and a depth of length L2 shorter than L1.

Note that since the rest of the above-described configuration is the same as the configuration of the first embodiment, common constituent elements are denoted by like reference numerals and characters and will be described in no further detail here.

According to the third embodiment of the positive electrode lead 50 configured in such a way as described above, even if a location where the first lead half body 51 is connected to the sealing body 30 is displaced due to dimensional errors or the like of the first lead half body 51, the bending position and shape of the first lead half body 51 can be flexibly adjusted accordingly in a process for manufacturing the nickel-hydrogen secondary battery 1, as in the second embodiment. Consequently, it is possible to further reduce the possibility of the protective member 54 becoming broken in the process for manufacturing the nickel-hydrogen secondary battery 1.

Fourth Embodiment of Positive Electrode Lead 50

A fourth embodiment of the positive electrode lead 50 according to the present invention will be described while referring to FIG. 9.

Figure 9:
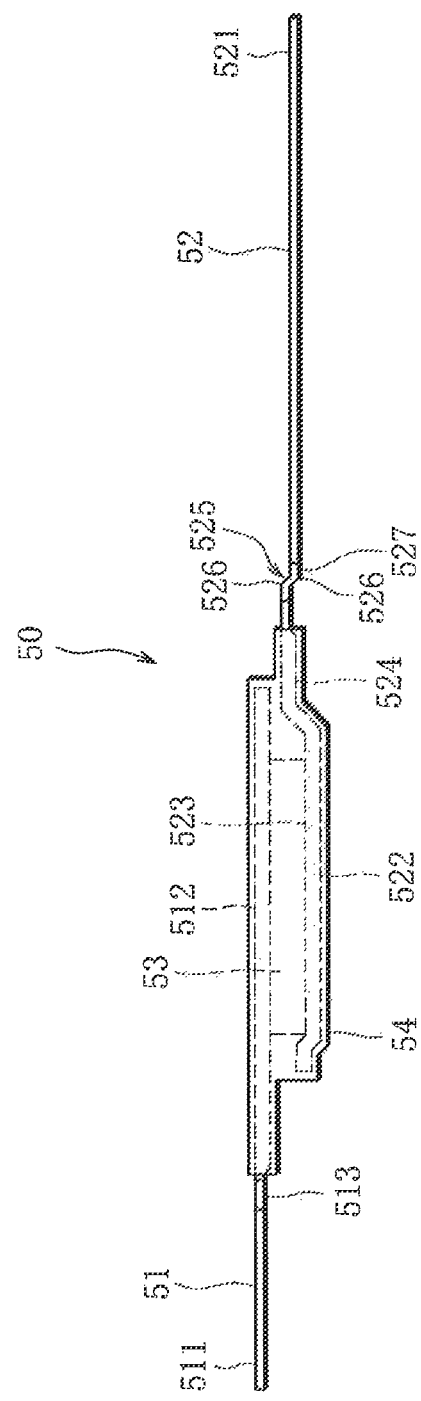
FIG. 9 is a side view of a positive electrode lead of a fourth embodiment.

FIG. 9 illustrates the positive electrode lead 50 as a component before being built into the nickel-hydrogen secondary battery 1 and is a side view of the positive electrode lead 50 of the fourth embodiment.

In the positive electrode lead 50 of the fourth embodiment, the portions of the first lead half body 51 and the second lead half body 52 covered with the protective member 54 are formed so as to be larger in plate thickness than portions outside those portions. According to the fourth embodiment of the positive electrode lead 50 configured as described above, the first lead half body 51 and the second lead half body 52 are more easily bendable on the outer side of the portions covered with the protective member 54. Consequently, it is possible to further reduce the possibility of the protective member 54 becoming broken in a process for manufacturing the nickel-hydrogen secondary battery 1.

Note that since the rest of the above-described configuration is the same as the configuration of the first embodiment, common constituent elements are denoted by like reference numerals and characters and will be described in no further detail here. Also note that in the fourth embodiment, the portion of only the first lead half body 51 or the second lead half body 52 covered with the protective member 54 may be formed so as to be larger in plate thickness than other portions.

EXPLANATION OF REFERENCE SIGNS

1 Nickel-hydrogen secondary battery
10 Exterior can
20 Electrode group
30 Sealing body
50 Positive electrode lead
51 First lead half body
52 Second lead half body
53 PTC thermistor
54 Protective member

The invention claimed is:

1. A positive electrode lead of an alkaline secondary battery comprising an exterior can the upper end of which is open; an electrode group formed by stacking positive electrodes and negative electrodes with separators interposed thereamong and housed in the exterior can along with an alkaline electrolytic solution; and sealing body fixed to the open end of the exterior can while being insulated and including a cap plate for sealing the opening and a positive electrode terminal electrically connected to the cap plate, the positive electrode lead being disposed between the electrode group and the sealing body to electrically connect the positive electrodes of the electrode group and the sealing body and comprising:

- a strip-shaped first lead half body electrically connected to the sealing body;
- a strip-shaped second lead half body electrically connected to the positive electrode;
- a PTC thermistor joined between the first lead half body and the second lead half body; and
- a protective member covering a portion of the positive electrode lead where the PTC thermistor is joined,
- wherein the second lead half body is provided with a portion to be bent when the second lead half body is disposed between the electrode group and the sealing body on the outer side of the portion covered with the protective member, a plurality of recessed grooves have a shape elongated in the direction intersecting with a bend line of the portion to be bent, the plurality of recessed grooves shaped such that a thickness of the second lead half body is maintained, the plurality of recessed grooves provided in a line in the portion of the second lead half body covered with a protective member in a direction along the bend line.

2. The positive electrode lead according to claim 1, wherein a fold is previously formed in the portion of the second lead half body to be bent.

3. The positive electrode lead according to claim 2, wherein the second lead half body includes a step, in the portion thereof to be bent, formed of two folds formed by bending the second lead half body in the opposite bending direction.

4. The positive electrode lead according to claim 3, wherein notches are additionally formed in the portion of the second lead half body to be bent.

5. The positive electrode lead according to claim 4, wherein the notches of the second lead half body are formed on both side edges of the portion to be bent.

6. The positive electrode lead according to claim 1, wherein notches are formed on both edges of the portion to be bent when the first lead half body is disposed between the electrode group and the sealing body.

7. The positive electrode lead according to claim 6, wherein the first lead half body is provided with portions to be bent in a plurality of places, and notches are formed on both edges of each of the plurality of portions to be bent.

8. The positive electrode lead according to claim 6, wherein the first lead half body is provided with portions to be bent in a plurality of places, and notches are formed on both edges of a region encompassing the plurality of portions to be bent.

9. The positive electrode lead according to claim 1, wherein the portion of the first lead half body or the second lead half body within the protective member is formed so as to be larger in plate thickness than portions outside the protective member.

10. An alkaline secondary battery comprising:
- an exterior can the upper end of which is open;
- an electrode group formed by stacking positive electrodes and negative electrodes with separators interposed thereamong and housed in the exterior can along with an alkaline electrolytic solution;
- a sealing body fixed to the open end of the exterior can while being insulated and including a cap plate for sealing the opening and a positive electrode thermal electrically connected to the cap plate; and
- a positive electrode lead according to claim 1.

* * * * *